(12) United States Patent
Kempf et al.

(10) Patent No.: US 9,698,549 B2
(45) Date of Patent: Jul. 4, 2017

(54) CONNECTOR PORT ARRANGEMENT IN AN ELECTRONIC DEVICE

(71) Applicant: Mettler-Toledo (Albstadt) GmbH, Albstadt (DE)

(72) Inventors: Edgar Kempf, Inzigkofen (DE); Xinwei Su, Changzhou Jiangsu (CN); Dieter Kontschak, Winterlingen (DE); Walter Holike, Geislingen (DE)

(73) Assignee: METTLER-TOLEDO (ALBSTADT) GMBH, Albstadt (DE)

( * ) Notice: Subject to any disclaimer, the term of this patent is extended or adjusted under 35 U.S.C. 154(b) by 0 days.

(21) Appl. No.: 14/862,644

(22) Filed: Sep. 23, 2015

(65) Prior Publication Data

US 2016/0087385 A1 Mar. 24, 2016

(30) Foreign Application Priority Data

Sep. 24, 2014 (EP) .................................. 14186069

(51) Int. Cl.
| | | |
|---|---|---|
| *H01R 13/73* | (2006.01) | |
| *H01R 27/02* | (2006.01) | |
| *G01G 23/00* | (2006.01) | |
| *G01G 19/414* | (2006.01) | |
| *G01G 21/28* | (2006.01) | |

(52) U.S. Cl.
CPC ......... *H01R 27/02* (2013.01); *G01G 19/4144* (2013.01); *G01G 21/283* (2013.01); *G01G 23/00* (2013.01); *H01R 13/73* (2013.01)

(58) Field of Classification Search
CPC .... H01R 27/02; H01R 13/73; G01G 19/4144; G01G 21/283; G01G 23/00
USPC ...... 439/535, 76.1, 76.2, 529, 650; 174/480, 174/481, 482
See application file for complete search history.

(56) References Cited

U.S. PATENT DOCUMENTS

| | | | | |
|---|---|---|---|---|
| 3,147,337 A * | 9/1964 | Chennell | ................ | H02G 11/02 174/60 |
| 3,910,536 A * | 10/1975 | Sharp | ..................... | H02G 3/045 174/138 D |
| 4,691,794 A * | 9/1987 | Larsen | ................. | G01G 3/1402 177/211 |
| 5,457,600 A * | 10/1995 | Campbell | .............. | H01R 25/00 307/150 |
| 5,924,892 A * | 7/1999 | Ferracina | ............... | H01R 13/72 439/501 |
| 6,133,526 A * | 10/2000 | Lebo | .................... | H05K 7/1448 174/481 |
| 6,443,765 B2 * | 9/2002 | Ichio | ............................ | 439/274 |

(Continued)

*Primary Examiner* — Harshad Patel
(74) *Attorney, Agent, or Firm* — Standley Law Group LLP

(57) ABSTRACT

An arrangement of connector ports for an electronic device, specifically for a weighing platform unit (1), includes a plurality of connector sockets (22, 23, 25, 26) which are installed in one or more walls of a chassis (4) thereof. The one or more walls that carry the connector sockets are interior partitioning walls that define a connector port compartment (20) inside the chassis. Furthermore, at least one wall section of the connector port compartment is an exterior wall section of the chassis and contains a passage opening (21). Electrical cables (30) that are terminated by plugs matching the connector sockets can be introduced into the connector port compartment through this passage opening.

13 Claims, 2 Drawing Sheets

(56) References Cited

U.S. PATENT DOCUMENTS

| | | | |
|---|---|---|---|
| 6,600,107 B1* | 7/2003 | Wright | H02B 1/202 174/101 |
| 6,766,093 B2* | 7/2004 | McGrath | H04Q 1/066 379/327 |
| 6,891,113 B2 | 5/2005 | Fringeli et al. | |
| 7,025,627 B2* | 4/2006 | Rosenthal | H01R 25/003 439/142 |
| 7,232,963 B2 | 6/2007 | Leisinger et al. | |
| 7,484,970 B1* | 2/2009 | Chen | H04Q 1/142 439/76.1 |
| 7,918,686 B1* | 4/2011 | Lin | H01R 13/743 439/557 |
| 8,716,611 B2 | 5/2014 | Schön | |
| 2002/0000338 A1* | 1/2002 | Gross | G01G 3/12 177/211 |

\* cited by examiner

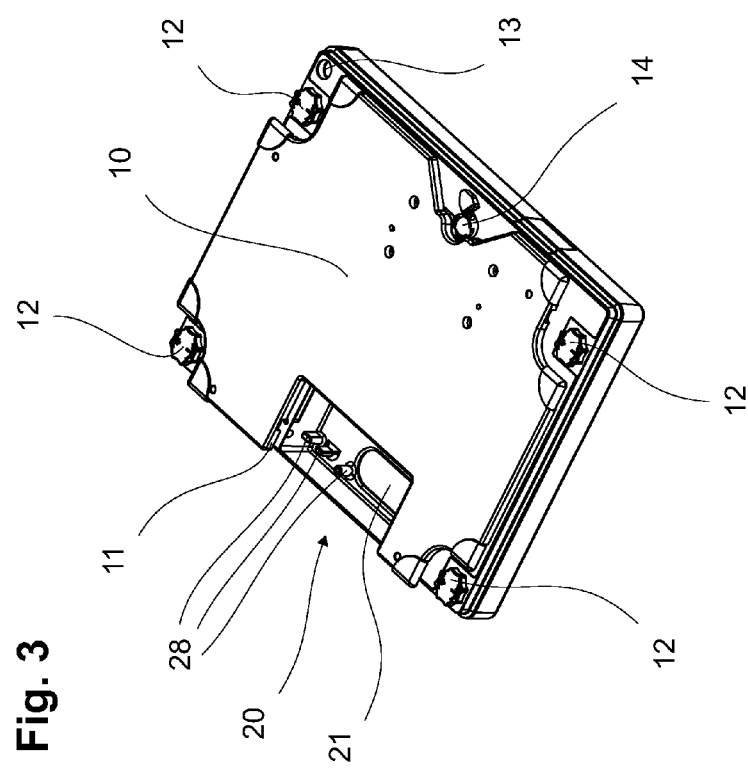
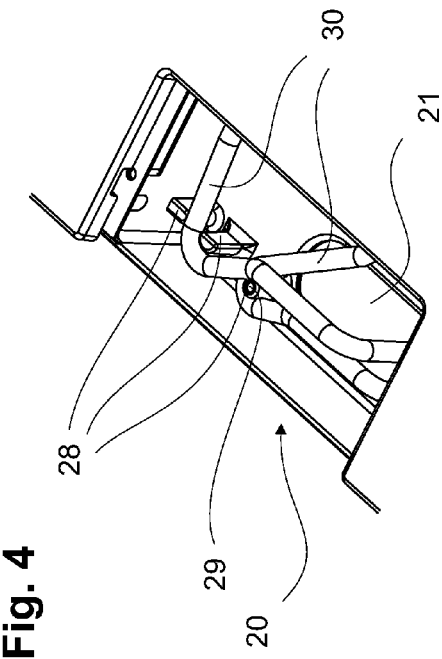
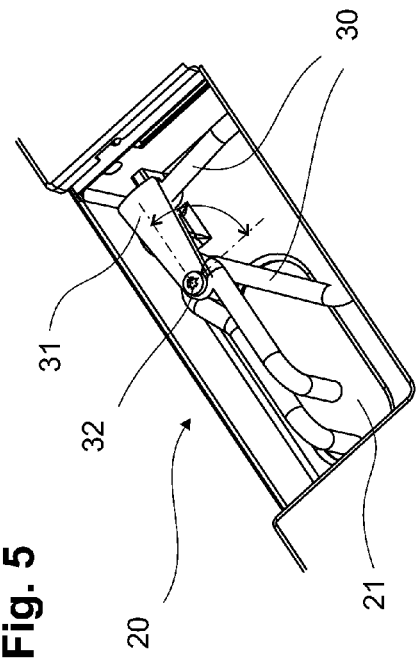

CONNECTOR PORT ARRANGEMENT IN AN ELECTRONIC DEVICE

CROSS-REFERENCE TO RELATED APPLICATIONS

This application is entitled to the benefit of a right of priority under 35 USC 119 from European application 14186069.2, filed 24 Sep. 2014. The content of that application is incorporated by reference as if fully recited herein.

TECHNICAL FIELD

The invention concerns an arrangement for the connector ports of an electronic device, specifically an electronic weighing scale. In electronic hardware, the term "port" generally means a receptacle or socket on the outside of an electronic unit into which a cable plug is inserted to establish a connection for the transmission of power as well as digital and analog signals. Connector ports have many uses, for example to connect a monitor, keyboard, mouse, printer, webcam, speakers or other peripheral devices to the main unit of a desktop computer, as well as to connect a plurality of computers in a network.

BACKGROUND

Electronic weighing scales, specifically of the kind used in retail stores to weigh for example meat, produce, cheese or seafood in different, individually packaged quantities as ordered by each customer, often have a systems architecture comparable to desktop computers insofar as a main unit of the scale is connected to peripheral units such as an operator panel, touch screen, customer display, printer, as well as to a computer network of the business in which the weighing scale is used. Electronic retail scales, except for basic stand-alone models, therefore often have a plurality of data ports and signal ports in addition to a line power connection.

The connections between a weighing scale and peripheral units through plugs and sockets arranged on the outside of the platform unit and through openly exposed cables represent a problem particularly with scales that are used for the aforementioned applications on retail store counters for meat, seafood, cheese and the like, because the cables and the plug-and-socket connections are prone to contamination, difficult to clean, and also objectionable from an esthetic point of view.

As an example of the state of the art, U.S. Pat. No. 8,716,611 B2 shows a weighing scale for use in the food sector. This scale has a power cable and a data cable permanently connected to the back of the enclosure, i.e. to the side that faces away from the operator. The cables enter the enclosure through cable fittings, also referred to as cable glands, which have the function of securely clamping and sealing the cables at their passages though the housing. While the fittings prevent water from reaching the interior working parts during cleaning, this solves only part of the aforementioned problem as the exposed cables are still esthetically objectionable and take up counter space. As a further drawback, if one of the permanently connected cables is damaged, it cannot simply be exchanged by the user but has to be removed and replaced by a service technician.

It has been considered to arrange the connector ports on the bottom of the scale enclosure and to route the cables to the scale through an opening in the countertop. This takes the cables as well as the plugs and sockets out of sight, but makes access to them very difficult. Also, if the scale is carelessly moved or lifted from the counter, for example in order to clean the area under the scale, the pull on the cables can damage the connectors to the extent that the scale becomes non-functional and will require service. Indeed, this has been found to be the most frequent cause of service calls from some supermarkets.

The present invention therefore has the objective to provide a connector port arrangement for an electronic scale, wherein connector ports and cables are easily accessible and the connectors can easily be plugged and unplugged but are at the same time hidden from view during normal operation, shielded from contamination, and protected against being accidentally unplugged or getting damaged by pulling forces.

SUMMARY

This task is solved by a connector port arrangement according to the independent main claim 1. Further configurations and embodiments of the subject of the invention are presented in the subordinate claims.

A connector port arrangement for an electronic device, specifically an electronic weighing scale, e.g. a weighing platform unit, according to the invention includes a plurality of connector sockets that are installed in one or more walls of a of the electronic device. According to the invention, the one or more walls carrying the connector sockets are interior walls defining a connector port compartment inside the chassis. Further according to the invention, at least one wall section of the connector port compartment is an exterior wall section of the chassis and contains a passage opening through which electrical cables which are terminated by plugs matching the connector sockets can be introduced into the connector port compartment.

In preferred embodiments of the invention, the exterior wall section with the passage opening through which the electrical cables are introduced into the connector port compartment is part of the floor of the chassis. This is particularly advantageous, if the countertop on which the electronic device is standing has a passage hole substantially lined up with the passage opening in the floor of the electronic device. Thus the cables can be routed from below the countertop through the passage hole in the countertop and through the passage opening in the chassis floor of the electronic device into the connector port compartment. This keeps the cables out of sight and saves space on the countertop.

Of course, the exterior wall section with the passage opening through which the electrical cables are introduced into the connector port compartment could also be part of an exterior side wall of the chassis, and such an arrangement would still be considered an embodiment of the present invention as long as the connector ports are arranged on interior walls of a compartment inside a chassis.

In preferred embodiments where the electronic device is a weighing scale with a load platform top cover that covers the entire top of a weighing platform base and has borders skirting downward over the sides of the chassis base, the connector port compartment is configured to be fully open from above when the top cover is lifted off the weighing platform base. This provides quick and convenient access from above to plug in or to unplug the cable connectors.

As a further advantageous feature of the invention, a plurality of vertical, spaced-apart cable-guiding posts (relative to the operating position of the electronic instrument) are arranged inside the connector port compartment, so that electrical cables can be dressed around and between the cable-guiding posts to protect the plug-and-socket connections of the connector ports from pulling forces on the electrical cables.

Preferably, the electrical cables which enter the connector port compartment through the passage opening and which are dressed around the cable-guiding posts and plugged into the connector ports are secured by at least one hold-down bar extending across the tops of the cable-guiding posts and holding the electrical cables captive in the interstices between the cable-guiding posts.

BRIEF DESCRIPTION OF THE DRAWINGS

Details of the connector port arrangement according to the invention are explained in the description of an example that is illustrated in the drawings, wherein:

FIG. 3 shows the weighing platform unit of FIG. 1 with the top cover removed and with the view directed at the cable-guiding posts;

FIG. 4 shows the connector port compartment of the weighing platform unit of FIG. 3, with cables dressed around the cable-guiding posts; and FIG. 5 shows the connector port compartment of the weighing platform unit of FIG. 3, with cables dressed around the cable-guiding posts and secured by the hold-down bar.

In the following, elements of the electronic device or weighing platform unit with the inventive connector port arrangement that are identical from one drawing to the next are identified by the same reference symbols.

DETAILED DESCRIPTION

Figure 1:
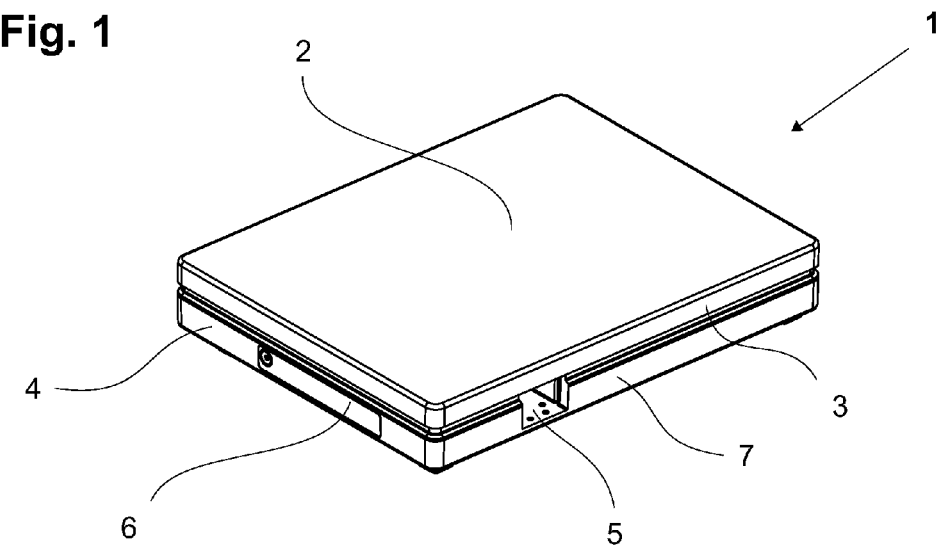
FIG. 1 represents a weighing platform unit of the type that can be equipped with the connector port compartment according to the invention.

FIG. 1 illustrates a weighing platform unit 1 of the type that can be equipped with a connector port arrangement according to the invention. The weighing platform unit 1 has a weighing platform base 4, inside of which the mechanical and electronic elements performing the weighing function are mounted and which also forms the bottom part of the enclosure of the weighing platform unit 1. The top cover 2, normally a stainless steel sheet metal stamping with deep-drawn skirted borders 3, receives the objects to be weighed and forms the top part of the enclosure of the weighing platform unit 1. A mounting area 5 is recessed in the weighing platform base 4 for the attachment of a support post or column which can carry an operator panel and a customer display and in some cases a label printer. A side-mounting area 6 for the optional attachment of peripheral devices such as a label printer or a WLAN antenna, which is visible in the drawing on a sidewall of the weighing platform base 4, is closed by a cover. These optional peripheral devices are being directly attached to the weighing platform unit 1 so that no electrical cable between them is visible from the outside.

Figure 2:
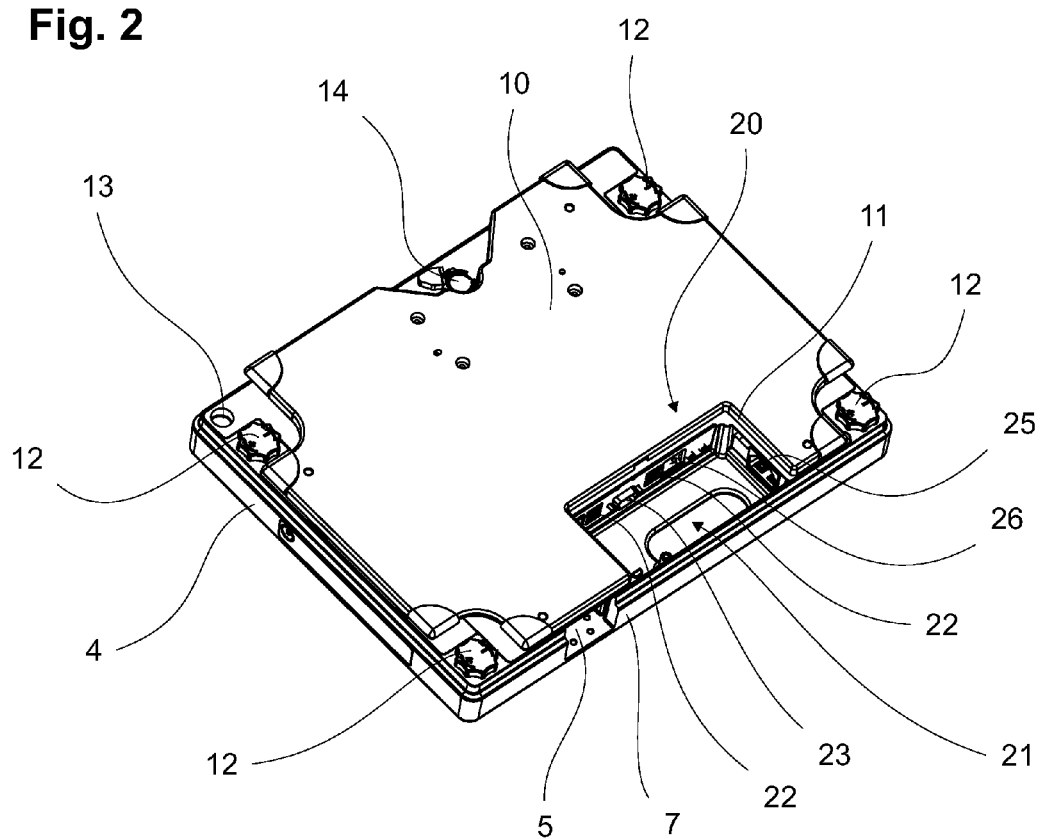
FIG. 2 shows the weighing platform unit of FIG. 1 with the top cover removed and with the view directed at the connector port compartment with the connector ports and the passage opening for the cables.

The top cover 2 can simply be lifted off the weighing platform unit 1. The parts which in FIG. 1 were covered by the top cover 2 can be seen in FIG. 2, where the view is directed at the top cover carrier 10 which in the illustrated embodiment has the form of a solid plate. The top cover carrier 10 is connected to and supported by a weighing cell (not visible) which is mounted on the weighing platform base 4 and converts the weight force exerted by the weighing load into an electrical signal. A cutout 11 in the top cover carrier 10 allows free access to the connector port compartment 20 with the connector ports 22, 23, 25, 26 and the passage opening 21 for the electrical cables 30 (see FIG. 4 and FIG. 5). The connector port compartment 20 is arranged on the same side of the weighing platform base 4 as the mounting area 5. In the case of a retail scale, this is the side facing towards the customer, i.e. the rear side of the scale as seen from the operator. In a conventional layout of the connector ports, the connector sockets 22, 23, 25, 26 would be arranged along the rear wall 7 of the weighing platform base 4, and cables as well as unused connector sockets would be in plain view of the customer as well as exposed to contamination. The inventive arrangement of a connector port compartment 20 with a bottom-exit opening 21 for the cables removes these objections and provides a clutter-free, neat appearance.

Other elements of the weighing platform unit 1 which are laid open by removing the top cover 2, include the adjuster knobs 12 for the leveling feet (not visible) of the weighing platform unit 1, the spirit level 13, and the Weights & Measures seal 14 which is required in so-called "Legal for Trade" weighing scales.

FIG. 3 shows the same weighing platform base 4, but seen from the opposite direction in order to bring the cable-guiding posts 28 into full view whose function is illustrated in FIG. 4 and FIG. 5.

Two electrical cables 30 are shown in FIG. 4 entering through the passage opening 21 into the connector port compartment 20, where they are dressed around and between the cable-guiding posts 28 and plugged into the connector sockets 22, 23, 25, 26, respectively. Because of the higher friction resistance occurring between the cable-guiding posts 28 and the electrical cables 30 the connector sockets 22, 23, 25, 26 are protected from pulling forces on the electrical cables 30.

FIG. 4 illustrates how the electrical cables 30 are securely held in place by a hold-down bar 31 which is fastened by a fastening screw 32 to the one of the cable-guiding posts 28 with a fastening hole 29. When the top cover 2 is in place and the weighing platform unit 1 is in operation, the cables must be reliably prevented from touching the top cover 2, as this would falsify the weighing result. The cable-guiding posts 28 and the hold-down bar 31 perform a critically important function by restraining the electrical cables 30 so that they can never touch the top cover 2 and also that the cable plugs cannot be pulled out of the sockets 22-27. If the electrical cables 30 need to be released, for example in order to exchange a weighing platform unit 1, the hold-down bar 31 can simply be swiveled out of place after loosening the screw 32.

Although the invention has been described through the presentation of specific examples, it will be evident to the reader that numerous further variant embodiments could be developed from the teachings of the present invention. For example, the connector port compartment need not be adjacent to one of the longer sides of a rectangular weighing platform unit, but could be arranged anywhere within the floor plan layout of a weighing platform base. While the applicants have developed the concept of a connector port compartment with a view to its use with a weighing scale, it should be obvious that the use of the invention is not limited to the weighing field, but that the invention covers any electronic instrument in which a connector port compartment could be advantageously used for a better arrangement of the cables. Also, it should be emphasized that the invention is not limited to the shapes and proportions of the elements shown in the drawings, but that the inventive concept could be fully realized with shapes and proportions different from those shown in the illustrations.

What is claimed is:

1. An arrangement for providing connector ports for one or more electrical cables, each cable terminated by a plug, in a weighing scale with a weighing platform base having a top cover that covers the entire top thereof, with borders of the top cover skirting downward over the sides of the weighing platform base, and having a chassis defined by exterior walls, the arrangement comprising:
    a plurality of interior partitioning walls which, together with a section of at least one of the exterior walls, define a connector port compartment inside the chassis with the connector port compartment being fully open from above when the top cover is lifted off of the weighing platform base;
    a plurality of connector sockets, installed in one or more walls of the connector port compartment; and
    a passage opening, formed in one of the exterior wall sections of the connector port compartment, for introducing the electrical cables into the connector port compartment.

2. The arrangement of claim 1, wherein:
    the passage opening is formed in a part of a floor of the chassis.

3. The arrangement of claim 1, wherein:
    the passage opening is formed in a part of an exterior side wall of the chassis.

4. The arrangement of claim 1, further comprising:
    a plurality of cable-guiding posts, arranged inside the connector port compartment with interstices between the cable-guiding posts such that the electrical cables are dressed around and between the cable-guiding posts to protect the plugs of the electrical cables and the sockets of the connector ports from pulling forces acting on the electrical cables while the plugs are connected to the sockets.

5. The arrangement of claim 4, further comprising:
    at least one hold-down bar that extends across the tops of the cable-guiding posts and holds captive, in the interstices between the cable-guiding posts, the electrical cables that enter the connector port compartment through the passage opening and that are dressed around the cable-guiding posts.

6. An arrangement for providing connector ports for one or more electrical cables, each cable terminated by a plug, in a weighing scale having a weighing platform base with a top cover that covers the entire top thereof, with borders of the top cover skirting downward over the sides of the weighing platform base, the arrangement comprising:
    a plurality of interior partitioning walls which, together with a section of at least one of the exterior walls, define a connector port compartment inside the chassis;
    the connector port compartment is fully open from above when the top cover is lifted off the weighing platform base;
    a plurality of connector sockets, installed in one or more walls of the connector port compartment; and
    a passage opening, formed either in a part of the floor or the chassis or in one of the exterior wall sections of the connector port compartment, through which the electrical cables are introduced into the connector port compartment.

7. The arrangement of claim 6, further comprising:
    a plurality of cable-guiding posts, arranged inside the connector port compartment with interstices between the cable-guiding posts such that the electrical cables are dressed around and between the cable-guiding posts to protect the plugs of the electrical cables and the sockets of the connector ports from pulling forces acting on the electrical cables while the plugs are connected to the sockets.

8. The arrangement of claim 7, further comprising:
    at least one hold-down bar that extends across the tops of the cable-guiding posts and holds captive, in the interstices between the cable-guiding posts, the electrical cables that enter the connector port compartment through the passage opening and that are dressed around the cable-guiding posts.

9. A weighing scale having an arrangement for providing connector ports for one or more electrical cables, each cable terminated by a plug, the weighing scale having a chassis defined by exterior walls and a weighing platform base with a top cover that covers the entire top thereof, with borders of the to cover skirting downward over the sides of the weighing platform base, the arrangement comprising:
    a plurality of interior partitioning walls which, together with a section of at least one of the exterior walls, define a connector port compartment inside the chassis, in which the connector port compartment is fully open from above when the top cover is lifted off of the weighing platform base;
    a plurality of connector sockets, installed in one or more walls of the connector port compartment; and
    a passage opening, formed in one of the exterior wall sections of the connector port compartment, for introducing the electrical cables into the connector port compartment.

10. The weighing scale of claim 9, wherein:
    the passage opening is formed in a part of a floor of the chassis.

11. The weighing scale of claim 9, wherein:
    the passage opening is formed in a part of an exterior side wall of the chassis.

12. The weighing scale of claim 9, further comprising:
    a plurality of cable-guiding posts, arranged inside the connector port compartment with interstices between the cable-guiding posts such that the electrical cables are dressed around and between the cable-guiding posts to protect the plugs of the electrical cables and the sockets of the connector ports from pulling forces acting on the electrical cables while the plugs are connected to the sockets.

13. The weighing scale of claim 12, further comprising:
    at least one hold-down bar that extends across the tops of the cable-guiding posts and holds captive, in the interstices between the cable-guiding posts, the electrical cables that enter the connector port compartment through the passage opening and that are dressed around the cable-guiding posts.

* * * * *

UNITED STATES PATENT AND TRADEMARK OFFICE
CERTIFICATE OF CORRECTION

| | | |
|---|---|---|
| PATENT NO. | : 9,698,549 B2 | |
| APPLICATION NO. | : 14/862644 | |
| DATED | : July 4, 2017 | |
| INVENTOR(S) | : Kempf et al. | |

It is certified that error appears in the above-identified patent and that said Letters Patent is hereby corrected as shown below:

In the Specification

In Column 6, Line 27, please delete "of the to cover" and insert -- of the top cover --.

Signed and Sealed this
Third Day of October, 2017

Joseph Matal
*Performing the Functions and Duties of the*
*Under Secretary of Commerce for Intellectual Property and*
*Director of the United States Patent and Trademark Office*